(12) United States Patent
Sugiyama

(10) Patent No.: US 7,463,808 B2
(45) Date of Patent: Dec. 9, 2008

(54) OPTICAL WAVEGUIDE, OPTICAL DEVICE, AND MANUFACTURING METHOD OF THE OPTICAL WAVEGUIDE

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/601,630

(22) Filed: Nov. 20, 2006

(65) Prior Publication Data
US 2008/0019651 A1    Jan. 24, 2008

(30) Foreign Application Priority Data
Jul. 18, 2006 (JP) .............................. 2006-195485

(51) Int. Cl.
*G02B 6/10* (2006.01)
(52) U.S. Cl. ........................................ 385/129; 385/132
(58) Field of Classification Search .................. None
See application file for complete search history.

(56) References Cited

U.S. PATENT DOCUMENTS

| 4,810,049 A | * | 3/1989 | Fischer et al. | ................ 385/132 |
| 7,177,490 B2 | * | 2/2007 | Sugiyama et al. | .............. 385/9 |
| 2002/0146190 A1 | * | 10/2002 | Doi et al. | ....................... 385/14 |

FOREIGN PATENT DOCUMENTS

| JP | 63-157109 | 6/1988 |
| JP | 01-201609 | 8/1989 |
| JP | 03-148625 | 6/1991 |

* cited by examiner

*Primary Examiner*—Michelle R. Connelly-Cushwa
*Assistant Examiner*—Chris Chu
(74) *Attorney, Agent, or Firm*—Staas & Halsey LLP

(57) ABSTRACT

An optical waveguide is formed by diffusing a second impurity to form a second diffusion area having a large refractive index on a substrate. A groove is formed at a portion of the substrate corresponding to an outside of a bend of a bent portion along the second diffusion area. A first diffusion area is formed by diffusing a first impurity from a bottom of the groove to reduce a refractive index of the substrate.

18 Claims, 8 Drawing Sheets

OPTICAL WAVEGUIDE, OPTICAL DEVICE, AND MANUFACTURING METHOD OF THE OPTICAL WAVEGUIDE

CROSS-REFERENCE TO RELATED APPLICATIONS

This application is based upon and claims the benefit of priority from the prior Japanese Patent Application No. 2006-195485, filed on Jul. 18, 2006, the entire contents of which are incorporated herein by reference.

BACKGROUND OF THE INVENTION

1. Field of the Invention

The present invention relates to a technology of an optical waveguide.

2. Description of the Related Art

An optical waveguide used in an optical modulator is manufactured by forming a metallic film of titanium (Ti) etc. on a part of a dielectric substrate (electro-optical crystal), such as an lithium niobate (LN: LiNbO3) substrate and a lithium tantalite (LiTaO2) substrate, and thermally diffusing the metallic film or by performing proton exchange in benzoic acid after patterning. After the optical waveguide is formed, electrodes are formed near the waveguide. By applying voltage to the electrodes, light modulation can be performed. Light transmitted through the waveguide is apt to be absorbed by the electrodes. To prevent such absorption, a buffer layer is formed between the LN substrate and the electrodes. A silicon oxide (SiO2) film of 0.2 to 1 micrometer (μm) thick is used as the buffer layer.

A linear optical waveguide and a bent optical waveguide are used in combination when an optical modulator is miniaturized, more than two optical modulators are connected in a multistage structure, or a long optical waveguide is formed in a single chip. Linear optical waveguides can be folded by bending an optical waveguide, thereby making a size compact.

FIG. 10A is a plan view of a conventional bent waveguide, and FIG. 10B is a cross-section of the conventional bent waveguide. An optical waveguide 502 bent at a radius of curvature R is formed on a substrate (LN substrate) 500 at a bent portion. The optical waveguide 502 is formed by diffusing an impurity such as Ti on the substrate 500. At the bent portion of the optical waveguide 502, light loss is large. Therefore, a groove 505 is formed at the outside of bend at the bent portion of the optical waveguide 502 on the substrate 500 so that light loss due to radiation is suppressed. A buffer layer 503 is formed on the substrate 500 as shown.

The formation of the groove 505, however, cannot eliminate light loss completely. The smaller the radius of curvature R is, the larger the loss becomes, and such large loss cannot be neglected. Light loss due to radiation can be reduced by enhancing the confinement of light within the optical waveguide 502.

FIG. 11 is a schematic of a conventional optical waveguide with enhanced confinement of light. An impurity diffusion layer 602 that is formed, by diffusing an impurity having a low refractive index, such as magnesium oxide (MgO), underneath a convex (ridge-shaped) optical waveguide 601 formed on a substrate 600 as shown in FIG. 11 or around the optical waveguide 601 (not shown) so as to lower a refractive index of the optical waveguide (for example, Japanese Patent Application Laid-Open Publication No. H01-201609). In such structure, the optical waveguide 601 functions as a core while the impurity diffusion layer 602 functions as a cladding. A large difference in refractive index between the core and the cladding enhances the confinement of light in the optical waveguide 601, thereby reducing light loss. Other examples of structures to enhance the confinement of light include a structure in which a diffusion layer formed with an impurity having a low refractive index is arranged along a bent portion of an optical waveguide at the outside of the bend (for example, Japanese Patent Application Laid-Open Publication No. S63-157109), and a structure in which a diffusion layer formed with an impurity having a low refractive index is arranged between optical waveguides (for example, Japanese Patent Application Laid-Open Publication No. H03-148625).

The conventional technique shown in Japanese Patent Application Laid-Open Publication No. H01-201609 (FIG. 11), however, is intended for a linear optical waveguide, and if merely the structure shown in FIG. 11 is applied to a bent waveguide, light loss increases due to radiation at a bent portion. In a manufacturing process, grooves are formed at both sides of the optical waveguide 601 to form a ridge portion where the optical waveguide 601 is formed into a convex shape. The grooves are formed by etching the substrate 600. If an etching pattern shifts with respective to the bend pattern of the optical waveguide 601 (shift in patterns), the impurity (MgO) having a low refractive index at the inside of the bend pushes a light mode to the outside. As a result, light loss increases.

Moreover, when the impurity (MgO) is formed over the entire surface of the substrate in a pattern of a greater width, as in the case of Japanese Patent Application Laid-Open Publication No. H01-201609, diffusion of Ti becomes difficult. This causes increase in light loss, or fluctuation of characteristics due to stress to the impurity generated when temperature changes. For example, an operating point voltage (bias voltage) of an optical modulator becomes unstable.

Furthermore, in the techniques described in Japanese Patent Application Laid-Open Publication Nos. S63-157109 and H03-148625, if a pattern of Ti and a pattern of MgO overlap each other, diffusion is hindered at the overlapping portion to be a nontransparent portion. As a result, light loss rather increases.

SUMMARY OF THE INVENTION

It is an object of the present invention to at least solve the above problems in the conventional technologies.

An optical waveguide according to one aspect of the present invention has a bent portion that is formed with a second diffusion area formed by diffusing a second impurity on a substrate. The second diffusion area has a high refractive index. The optical waveguide includes a groove formed at a portion of the substrate corresponding to an outside of a bend of the bent portion along the second diffusion area; and a first diffusion area formed by diffusing a first impurity from a bottom of the groove to reduce a refractive index of the substrate.

An optical device according to another aspect of the present invention includes an optical waveguide that has a bent portion, and that is formed in a second diffusion area having a large refractive index formed by diffusing a second impurity on a substrate; and a signal electrode arranged on top of the second diffusion area along the second diffusion area. The optical waveguide further includes a groove formed at a portion of the substrate corresponding to an outside of a bend of the bent portion along the second diffusion area; and a first diffusion area formed by diffusing a first impurity from a bottom of the groove to reduce a refractive index of the substrate.

A method of manufacturing an optical waveguide according to still another aspect of the present invention includes forming a pattern having a bent portion with a second impurity film on a substrate, the second impurity film to increase a refractive index; forming a groove at a portion of the substrate corresponding to an outside of a bend of the bent portion along the second impurity film; forming a pattern of a first impurity film on a bottom of the groove, the first impurity film to reduce a refractive index; and applying heat to both the second impurity film and the first impurity film to form a second diffusion area in which the second impurity film is diffused and the first diffusion area in which the first impurity film is diffused, inside the substrate.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings. A feature of an optical waveguide according to the present invention is to reduce a refractive index of a part of a substrate that is outside and/or under a bent portion of the optical waveguide to confine light in the optical waveguide. Specifically, an impurity is diffused from the bottom (e.g. a part of the bottom or bottom face) and/or a side of a groove formed at the outside of the bent portion of the optical waveguide to reduce the refractive index of the part of substrate at the bent portion.

Figure 1:
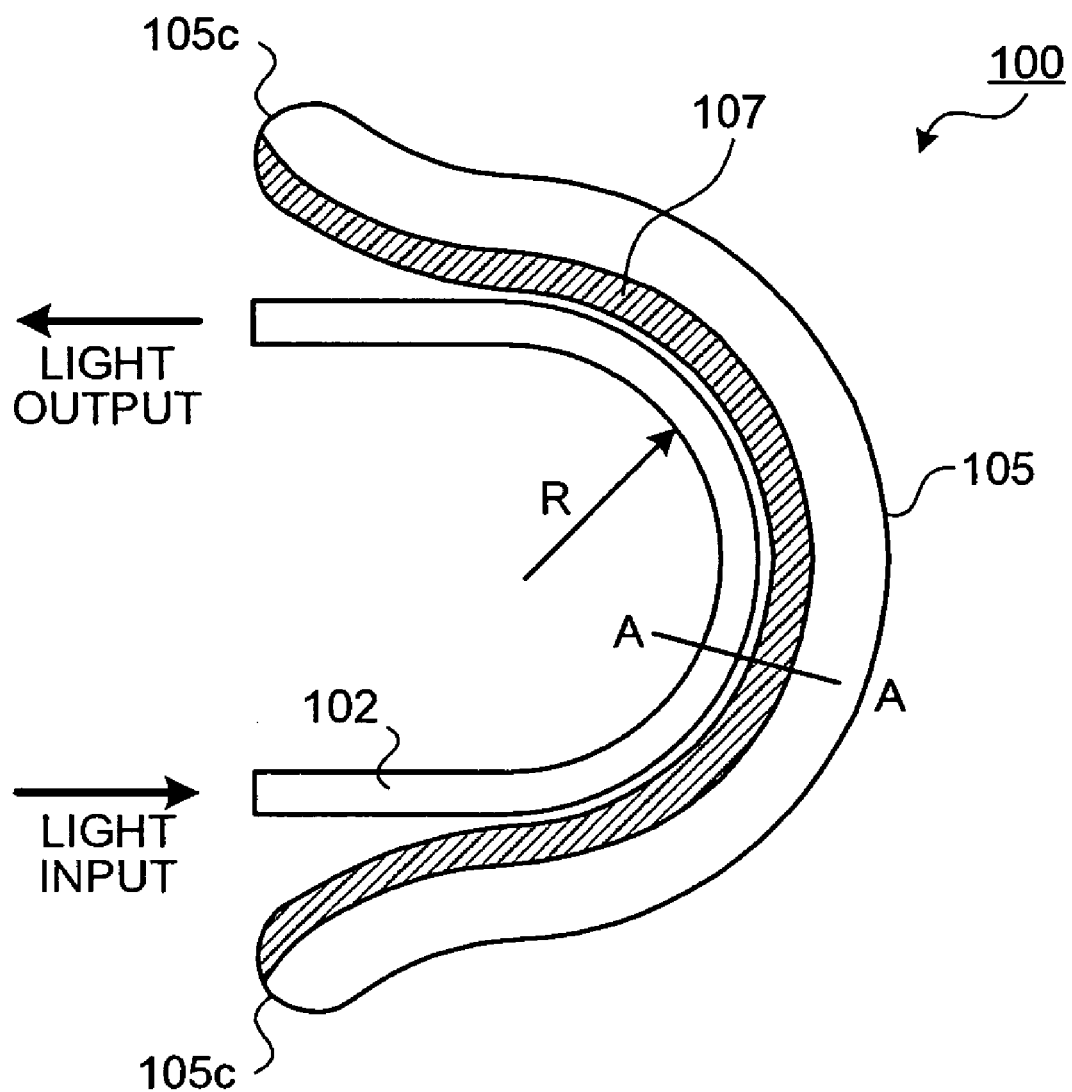
FIG. 1 is a plan view of an optical waveguide according to a first embodiment of the present invention.
Figure 2:
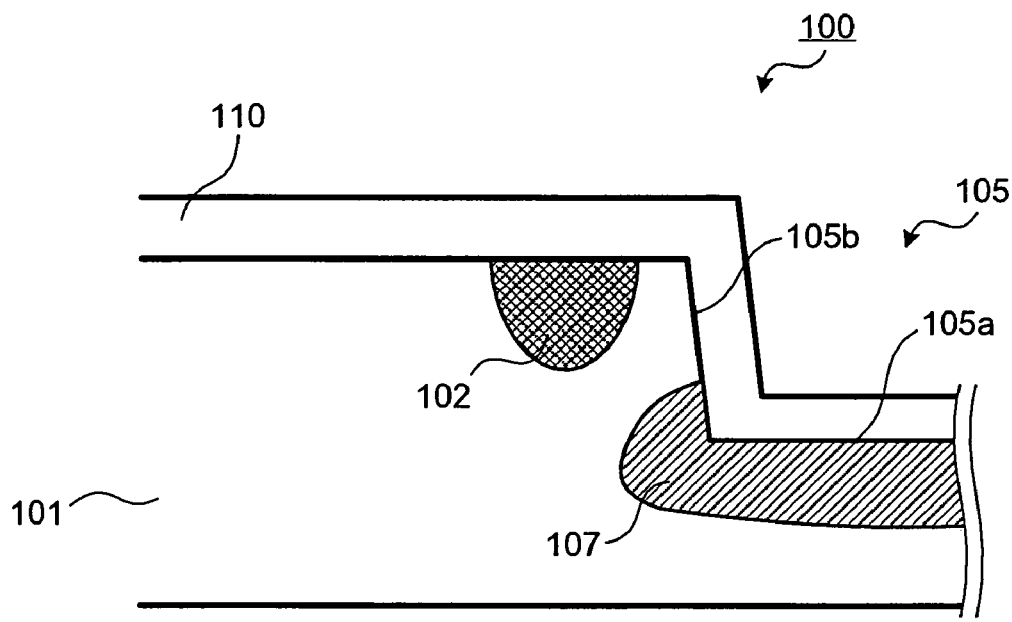
FIG. 2 is a cross-section of the optical waveguide taken along a line A-A shown in FIG. 1.

FIG. 1 is a plan view of an optical waveguide according to a first embodiment of the present invention. FIG. 2 is a cross-section of the optical waveguide taken along a line A-A shown in FIG. 1. An optical device 100 has a bent portion at which the optical waveguide is bent at a radius of curvature R. A second diffusion area at which a second impurity (impurity 2) such as Ti is diffused is formed on a substrate 101. The second diffusion area functions as an optical waveguide 102 through which light travels. The portion of the substrate 101 where the optical waveguide 102 is formed is made to have a higher refractive index than other portions. The optical waveguide 102 is formed into a linear shape having a predetermined pattern width of, for example, 3 μm to 10 μm.

As shown in FIG. 1, at the outside of bend of the bent portion, a groove 105 is formed by etching so as to extend along the bend of the optical waveguide 102. The substrate 101 is a dielectric substrate such as a z-cut-type LN (LiNbO$_3$) substrate.

Along the groove 105, a first diffusion area (diffusion area 1) 107 at which a first impurity (impurity 1) such as MgO is diffused is formed on a bottom 105a or a side face 105b of the groove 105 to make a refractive index of the substrate 101 low. In the example shown in FIG. 2, the first diffusion area 107 is formed to extend from the bottom 105a to a part of the side face 105b (below the optical waveguide 102). By diffusing the first impurity from the bottom 105a to a portion below the optical waveguide 102, the confinement of light in a vertical direction of the substrate 101 can be enhanced, thereby reducing light loss due to radiation.

As shown in FIG. 1, the groove 105 is formed to be substantially semicircular along the bend of the bent portion of the optical waveguide 102. In the semicircular shape, ends 105c of the groove 105 gradually separate outwardly from the linear portions of the optical waveguide 102 as the groove 105 extends away from a bending start position and a bending end position toward the linear portions. Since the first diffusion area 107 is formed along the groove 105 to have a similar pattern as that of the groove 105, the first diffusion area 107 is also formed to gradually separate away from the linear portions of the second diffusion area (optical waveguide 102) as shown in FIG. 1. In other words, the first diffusion area 107 gradually approaches the second diffusion area as the second diffusion area extends from the bending start position and the bending end position toward a central portion of the bend of the bent portion.

The above structure causes the profile of the refractive index to gradually vary, thereby enabling the transition (between the linear portion and the bent portion) while suppressing light loss at the bent portion. Thus, connection loss (light loss) at a connecting portion between the linear portions and the bent portion is reduced.

A buffer layer 110 having a low refractive index is formed over the entire surface of the substrate 101 on which the optical waveguide 102 is formed. The buffer layer 110 is transparent to infrared rays, and is made of an insulating material, such as SiO$_2$ (refractive index 1.5), that has a refractive index lower than that of the material of the substrate 101. As shown in FIG. 2, the buffer layer 110 is formed also at a side of the optical waveguide 102 according to the shape of the groove 105. Electrodes (not shown) are formed on the buffer layer 110 to realize various optical devices including an optical modulator and an optical switch.

Figure 3:
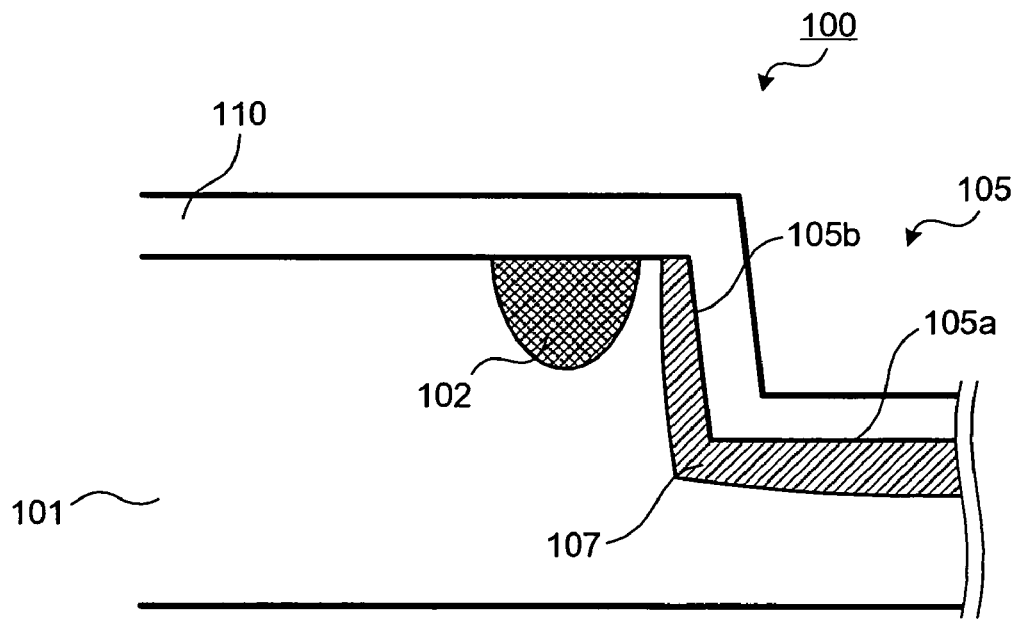
FIG. 3 is a cross-section of another optical waveguide according to the first embodiment.

FIG. 3 is a cross-section of another optical waveguide according to the first embodiment. In the structure shown in FIG. 3, the first diffusion area 107 is formed not only on the bottom 105a of the groove 105, but also on the entire surface of the side face 105b. As a result, the first diffusion area 107 is formed on the whole side of the second diffusion area (optical waveguide 102). By arranging the first diffusion area 107 on the whole side of the second diffusion area (optical waveguide 102), the confinement of light in a horizontal direction of the optical waveguide 102 is enhanced, thereby reducing light loss due to scattering caused when the side face 105b of the groove 105 is rough.

Figure 4:
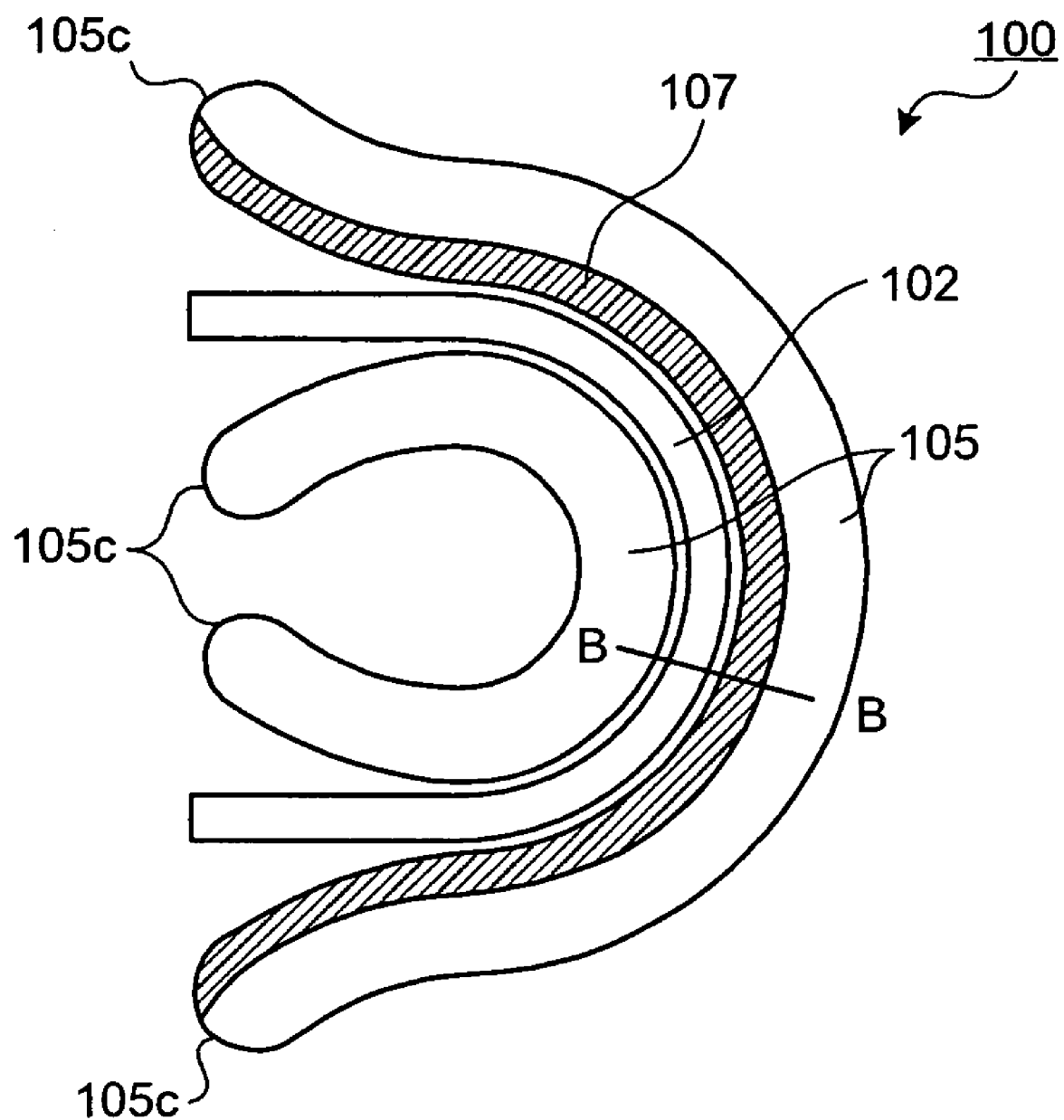
FIG. 4 is a plan view of an optical waveguide according to a second embodiment of the present invention.
Figure 5:
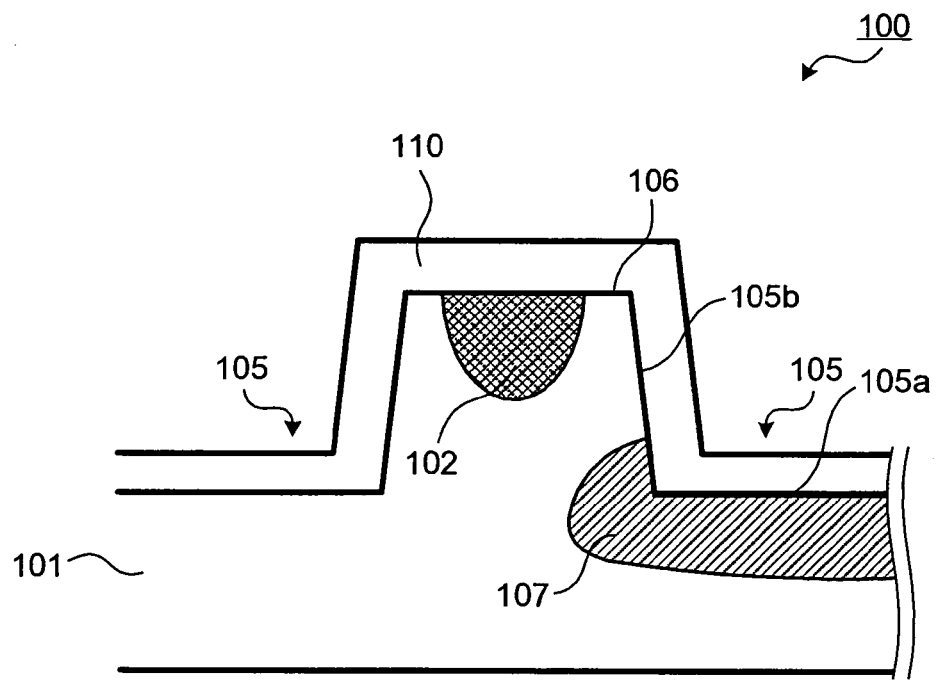
FIG. 5 is a cross-section of the optical waveguide taken along a line B-B shown in FIG. 4.

FIG. 4 is a plan view of an optical waveguide according to a second embodiment of the present invention. FIG. 5 is a cross-section of the optical waveguide taken along a line B-B shown in FIG. 4. The same components described in the first embodiment (see FIGS. 1 and 2) are denoted by the same reference numerals used in the first embodiment. The optical waveguide of the second embodiment is different from the optical waveguide of the first embodiment in that the groove 105 made by etching is formed on both sides (inside and outside) of the bend of the bent portion of the optical waveguide 102. As a result, a convex ridge portion 106 is formed between the grooves 105, and the optical waveguide 102 is arranged in the ridge portion 106.

In the second embodiment, the buffer layer 110 is formed over the entire surface of the substrate 101 as in the first embodiment. By arranging electrodes (not shown) on the buffer layer 110 covering the top face of the ridge portion 106, a structure of an optical modulator or an optical switch can be obtained. Such a structure that the electrodes are formed on the ridge portion 106 improves efficiency in applying an electric field to the electrodes.

Also in the structure in which the optical waveguide 102 is formed in the ridge portion 106, the first diffusion area 107 is formed on the bottom 105a of the groove 105 formed at the outside of the bend of the bent portion as shown in FIGS. 4 and 5. Thus, light loss due to radiation at the bent portion of the optical waveguide 102 arranged in the ridge portion 106.

Figure 6:
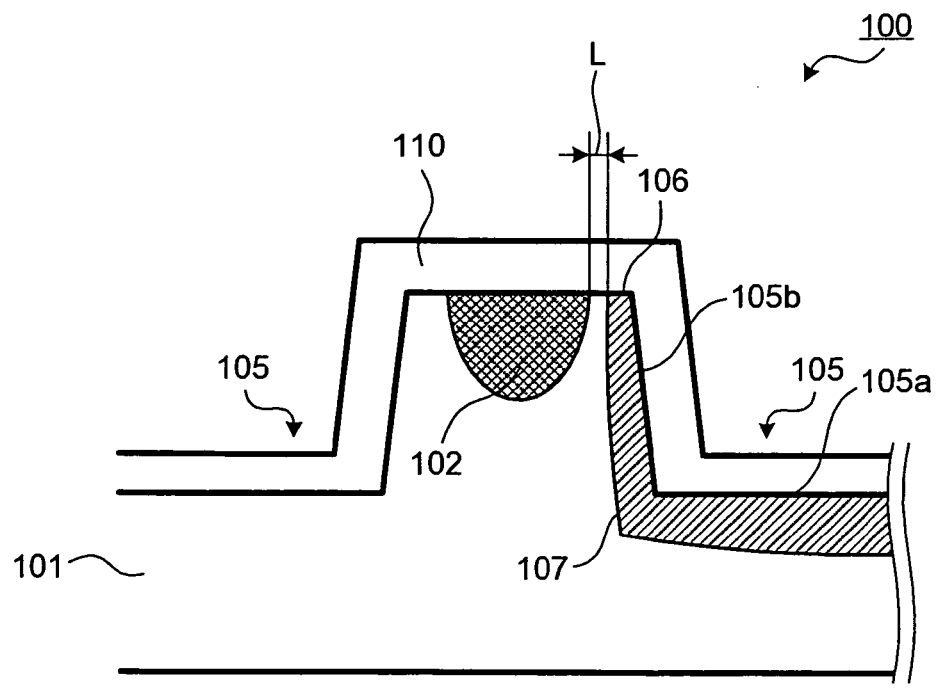
FIG. 6 is a cross-section of another optical waveguide according to the second embodiment.

FIG. 6 is a cross-section of another optical waveguide according to the second embodiment. In a structure shown in FIG. 6, the first diffusion area 107 is formed not only on the bottom 105a of the groove 105, but also on the whole of the side face 105b. This side face 105b of the groove 105 is one on outside of the bend of the bent portion. In other words, this side face 105b is inner side face at the bent portion of the groove 105. With the first diffusion area 107 arranged on the whole of the side of the area where the second impurity such as Ti is diffused (optical waveguide 102), the confinement of light in a horizontal direction in the optical waveguide 102 is enhanced. As a result, light loss due to scattering caused when the side face 5b of the groove 105 is rough is reduced.

In the structure described in the first embodiment and the second embodiment, light loss at the bent portion becomes significant when the radius curvature R is smaller than, for example, 2.5 millimeters (mm). Therefore, only for the optical waveguide 102 having a bent portion of which radius curvature is smaller than 2.5 mm, the groove 105 and the first diffusion area 107 may be formed.

The optical waveguide 102 functioning as a core may be formed by proton exchange instead of diffusion of the second impurity such as Ti. The width of the optical waveguide 102 is set to be approximately 3 μm to 10 μm so as to enhance the confinement of light. If a pattern of the first diffusion area 107 (width of the diffusion area 107 shown in FIGS. 1 and 4) is too narrow, sufficient effect is not obtained. If the pattern of the first diffusion area 107 is too wide, stress is caused to make the characteristic of the optical waveguide 102 unstable. Therefore, the width of pattern of the first diffusion area 107 is determined to be approximately 5 μm to 20 μm.

If the pattern of the optical waveguide 102 formed by the diffusion of the second impurity overlaps the pattern of the first diffusion area 107 formed with the first impurity, diffusion is hindered on the overlapping portion to make the overlapping portion be a nontransparent area. As a results, light loss further increases. To prevent this, it is preferable to form the pattern of the optical waveguide 102 and the pattern of the first diffusion area 107 keeping therebetween a gap (gap L shown in FIG. 6) of 1 μm or more. The depth of the groove 105 from the surface of the substrate is preferably 5 μm or more because the mode field diameter of light is approximately 5 μm.

The first impurity and the second impurity are diffused at the same time. After the diffusion, an insulating film (buffer layer 110) of $SiO_2$ etc. is formed on the side face of the groove 105. The insulating film is transparent to infrared rays, and has a refractive index lower than that of the substrate 101. The buffer layer 110 enables a further reduction in light loss due to scattering caused when the side face 105b of the groove 105 is rough.

Figure 7:
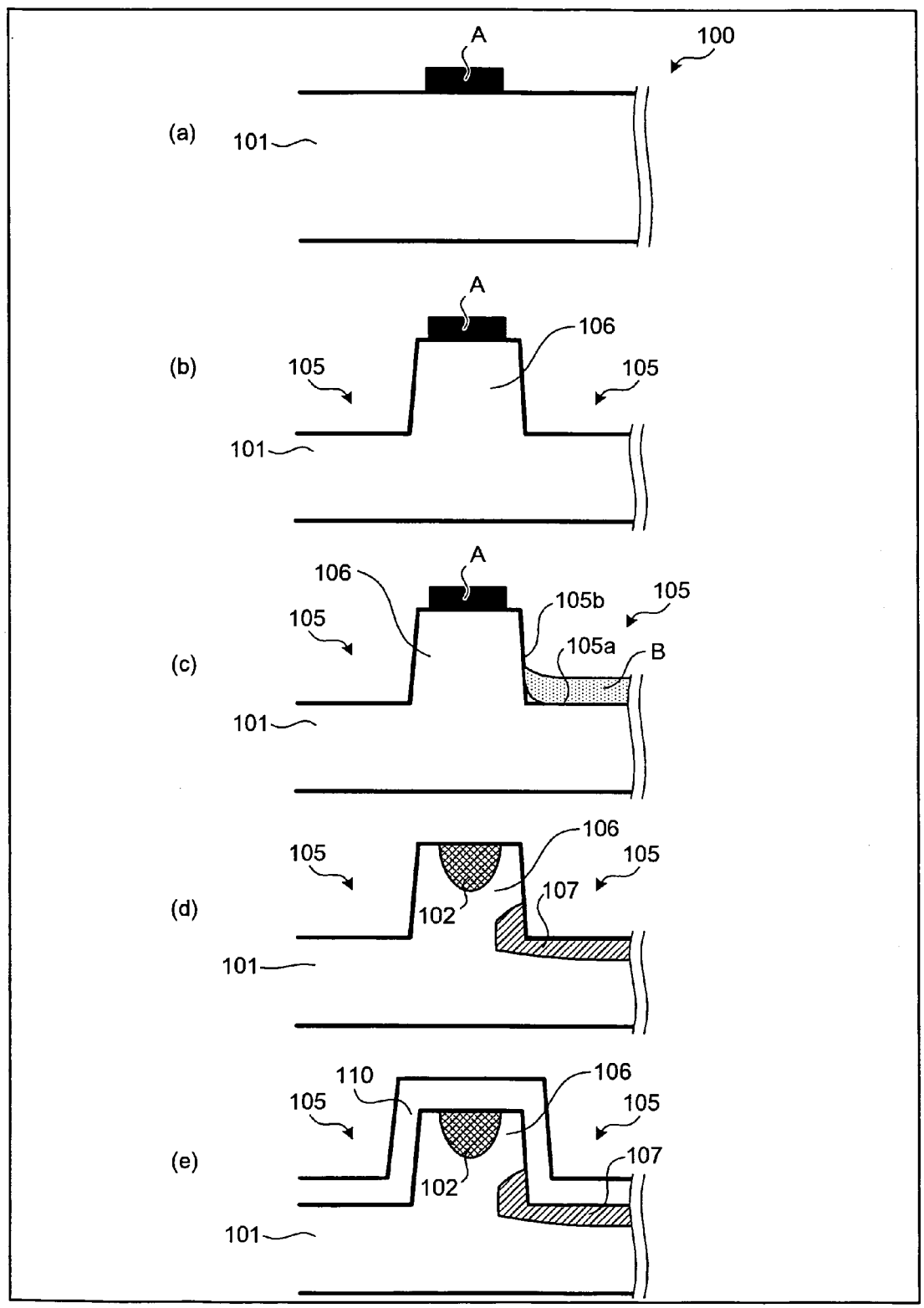
FIG. 7 is a schematic for illustrating a manufacturing process of the optical waveguide according to embodiments of the present invention.

FIG. 7 is a schematic for illustrating a manufacturing process of the optical waveguide. As an example, the process of manufacturing the optical waveguide arranged in the ridge portion 106 described in the second embodiment (see FIGS. 4 and 5) is shown. First, (a) a pattern of a metallic film A of the second impurity such as Ti is formed on the surface of the substrate 101 such as an LN substrate. The pattern is formed to have the bent portion bent at the radius curvature R (see FIG. 4). Subsequently, (b) the groove 105 is formed on both sides of the metallic film A (the ridge portion 106 is formed into a relatively convex shape) by etching the substrate 101 using a mask and the like. Each groove 105 is formed along the bent portion.

(c) A pattern of a metallic film B of the first impurity such as MgO is formed on the groove 105 arranged at the outside of the bend of the bent portion, using a mask having a shape along the bend. The metallic film B is formed so as to reach the side face 105b of the groove 105. The side face 105b of the groove 105 is also a side face of the ridge portion 106.

Then, (d) the metallic film A and the metallic film B are diffused under high temperature. The temperature is a predetermined temperature enabling each of the metallic films A and B to be diffused (e.g. 1000° C. at which Ti of the metallic film A can be diffused). Thus, the second diffusion area (optical waveguide 102) is formed on the top of the ridge portion 106, and the first diffusion area (diffusion area 1) 107 is formed on the groove 105 arranged at the outside of the bend of the bent portion. The metallic film A diffuses downward from the top of the ridge portion 106. The metallic film B diffuses downward from the bottom 105a of the groove 105, and from the side face 105b of the groove 105 toward the interior of a portion of the ridge portion 106 near the bottom 105a (in a horizontal direction in FIG. 7). As described at the process (c), the metallic film B is formed on the top of the ridge portion 106, and the metallic film A is formed on the bottom 105a of the groove 105. The metallic film B and the metallic film A, therefore, are separated from each other, thereby preventing the first impurity and the second impurity from being mixed at the diffusion process (d).

Then, (e) the buffer layer 110 formed with a film of $SiO_2$, etc. having a low refractive index is formed on the surface of the substrate 101. The buffer layer 110 is formed to continuously cover the bottom 105a, the side face 105b, and the ridge portion 106.

When the ridge portion 106 is not formed, as in the case of the first embodiment, the groove 105 is formed only at the outside of the bend of the bent portion in the above process (b).

According to the above manufacturing method, the first diffusion area 107 shown in FIG. 5 according to the second embodiment is formed. In the process (c), when a pattern of the metallic film B of MgO, etc. is formed on the whole of the side face 105b of the groove 105, the first diffusion area 107 shown in FIG. 6 is formed.

The manufacturing method is not limited to the above manufacturing method. Another method is as follows: 1.

Forming a pattern of the second impurity such as Ti, 2. diffusing the second impurity, 3. forming the groove 105 by etching, 4. forming a pattern of the first impurity such as MgO on the groove 105, 5. diffusing the first impurity, and then 6. forming the buffer layer 110. This manufacturing method requires six processes, which is more than five processes in the manufacturing method shown in FIG. 7. Especially, 2. the second impurity diffusion process and 5. the first impurity diffusion process have to be executed as each independent process, resulting in increase in the number of processes. In addition, a relatively low temperature not causing the diffusion of the second impurity such as Ti must be adopted in 5. the first impurity diffusion process. This hinders the diffusion of the first diffusion area 107.

A still another manufacturing method is as follows: 1. Forming a pattern of the second impurity such as Ti, 2. forming a pattern of the first impurity such as MgO on a side of the second impurity, 3. diffusing the first impurity and the second impurity at the same time, 4. forming the groove 105 by etching, and then, 5. forming the buffer layer 110. This manufacturing method allows the simultaneous diffusion of the first impurity and the second impurity, thereby reducing the number of processes to five. However, according to this method, the first diffusion area 107 is removed by etching when the groove 105 is formed. Because of this, the first diffusion area 107 cannot be made large. Besides, simultaneous diffusion of the first impurity and the second impurity from the same surface of the substrate 101 may cause the impurities to be mixed. For example, when the metallic film B is formed into a thick film to ensure a large pattern of the first diffusion area 107 made of the first impurity diffusing toward the bottom of the substrate 101, a possibility is high that the first diffusion area 107 mixes into the second diffusion area (optical waveguide 102) made of the second impurity. In the diffusion process 3, both the first impurity and the second impurity are diffused from the upper surface of the substrate 101 toward the bottom of the substrate 101. As a result, the first diffusion area 107 is arranged only at the side of the second diffusion area (optical waveguide 102). The first diffusion area 107, therefore, cannot be arranged at a lower part of the second diffusion area (optical waveguide 102).

In contrast, the manufacturing method described referring to FIG. 7 enables the simultaneous diffusion of the metallic film B and the metallic film A in a single process, and reduces the number of processes into five processes of (a) to (e). According to the method, the metallic film B can be formed to extend from the groove 105 and intrude laterally toward the lower part of the ridge portion 106. In other words, the first diffusion area 107 can be arranged at the lower part of the optical waveguide 102. As a result, the first diffusion area 107, which is formed on the bottom 105*a* of the groove 105, enhances the confinement of light in a vertical direction at the bent portion of the optical waveguide 102, thereby reducing light loss due to radiation at the bent portion. The first diffusion area 107, which is formed on the side face 105*b* of the groove 105, enhances the confinement of light in a horizontal direction in the substrate 101, thereby reducing light loss due to scattering caused when the side face 105*b* is rough.

In the process (d) of the manufacturing method described referring to FIG. 7, the diffusion areas can be formed by proton exchange in a benzoic acid, instead thermal diffusion. In carrying out a proton exchange method, the metallic film B is diffused by heat prior to the process (d) to form the first diffusion area 107.

Figure 8:
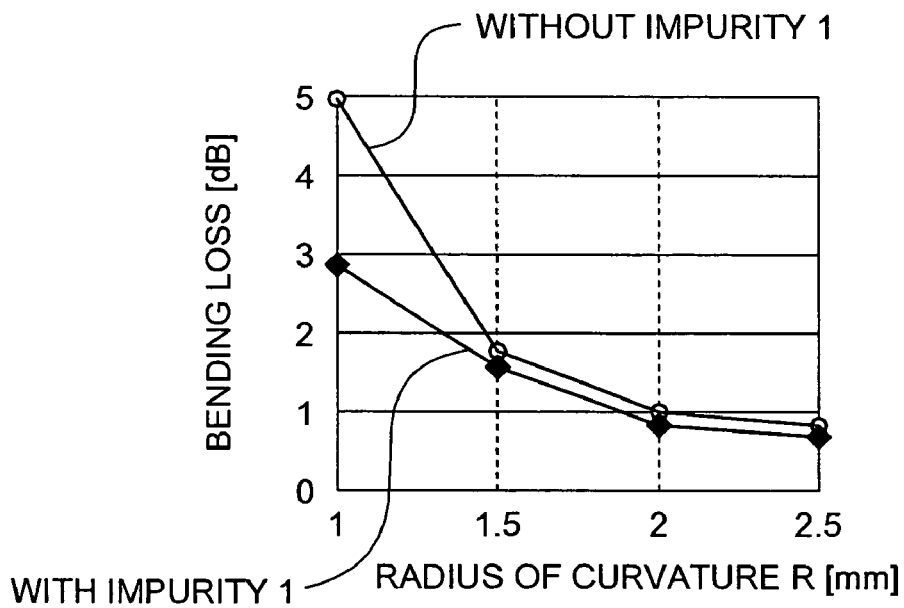
FIG. 8 is a characteristic chart of the optical waveguide.

FIG. 8 is a characteristic chart of the optical waveguide. The horizontal axis represents the radius curvature R [mm], and the vertical axis represents bending loss (light loss at the bent portion) [dB]. As shown in FIG. 8, the above structure of the optical waveguide "with the first impurity (impurity 1)" reduces bending loss in the entire range of the radius curvature of approximately 2.5 mm or smaller. When the radius curvature is 1 mm, the optical waveguide "with the first impurity (impurity 1)" reduces bending loss by 2 decibels (dB), compared to the conventional optical waveguide. With the optical waveguide according to the present invention, a greater effect is obtained in reducing light loss at the bent portion, as the radius curvature becomes smaller.

Figure 9:
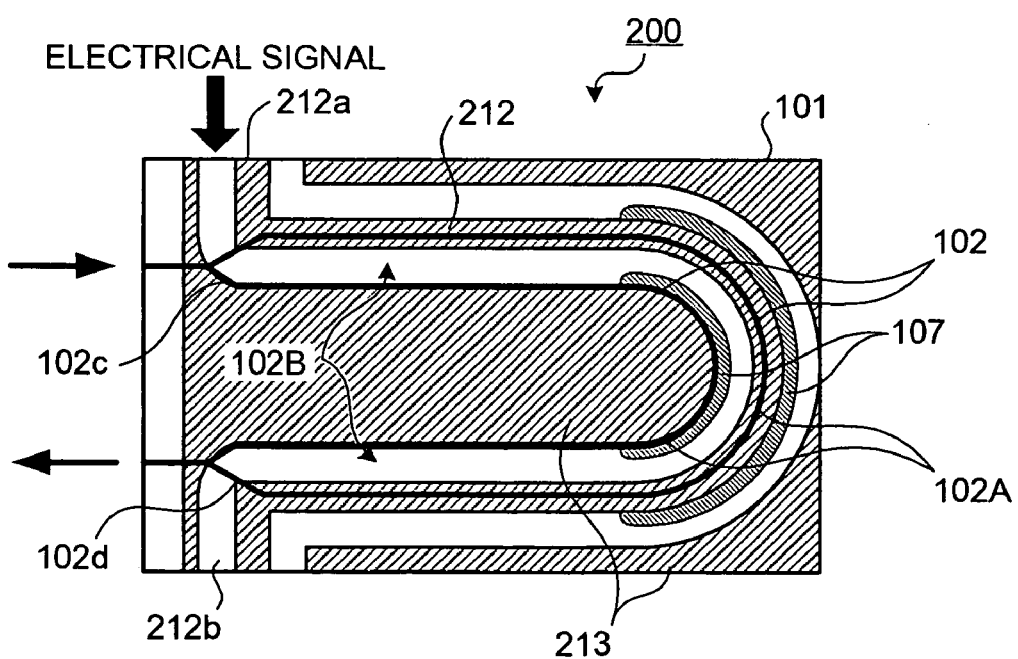
FIG. 9 is a schematic an optical modulator according to a third embodiment of the present invention.
Figure 10A:
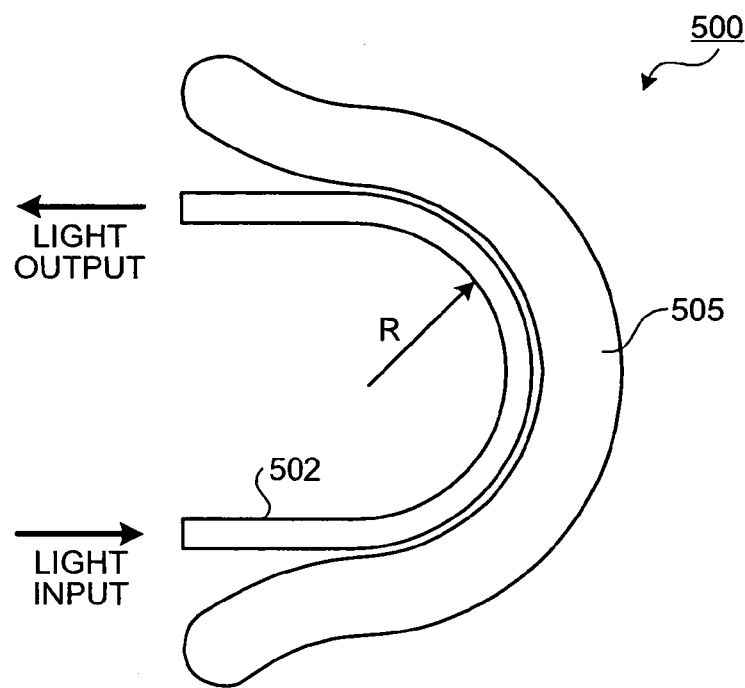
FIG. 10A is a plan view of a conventional bent waveguide.
Figure 10B:
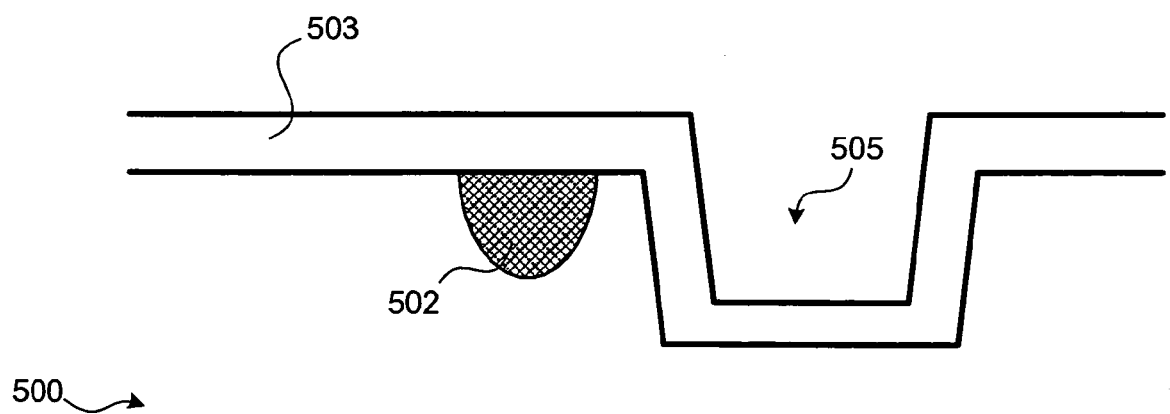
FIG. 10B is a cross-section of the conventional bent waveguide.
Figure 11:
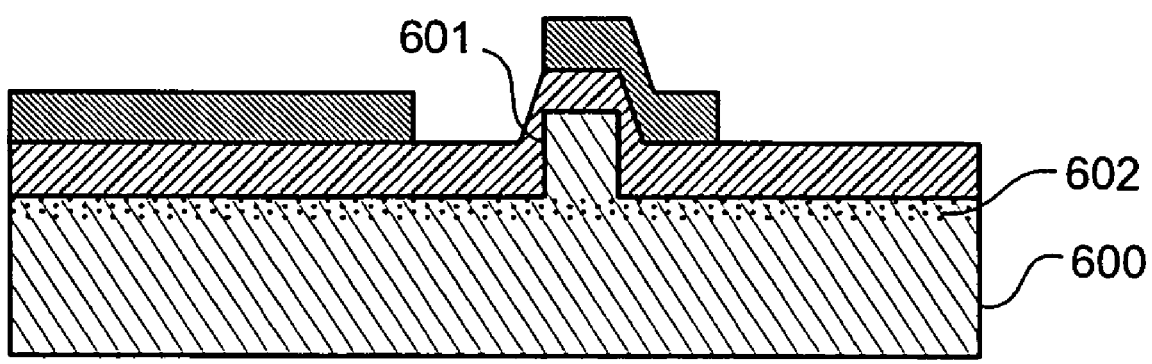
FIG. 11 is a schematic of a conventional optical waveguide with enhanced confinement of light.

In a third embodiment of the present invention, the optical waveguide according to the first and the second embodiments is applied to an optical device. The optical device includes an optical modulator and an optical switch. FIG. 9 is a schematic an optical modulator according to the third embodiment. The optical modulator shown in FIG. 9 is an optical modulator of a Mach-Zehnder interferometer type in which a bent portion is formed at a portion of an optical waveguide.

A signal line 212, signal electrodes 212*a*, 212*b*, and ground electrodes 213 are formed on the substrate 101 of the optical modulator 200 shown in FIG. 9. A signal line 212 has a length satisfying a predetermined working length (L0) necessary for generating phase difference, and has a bent portion formed by bending a part of the signal line into an approximate U shape. The optical waveguide 102 is arranged along the signal line 212, and has branch portions 102*c* and 102*g* at spots where the optical waveguide 102 overlaps the signal line 212. Between the branch portions 102*c* and 102*d*, two branched optical waveguides 102 are arranged in parallel with each other. The branched optical waveguides 102 have bent portions 102A and linear portions 102B described in the first and the second embodiments, and function as interacting portions where light and microwaves interact with each other.

Each branched optical waveguide 102 is provided with the groove 105 (not shown) and the first diffusion area 107. This enables the confinement of light within the branched optical waveguide 102 at the bent portion 102A, thereby reducing light loss at the bent portion 102A. As described above, if the first diffusion area 107 is formed on the bottom of the groove 105, light loss due to radiation can be reduced. If the first diffusion area 107 is formed on the side face of the groove 105, light loss due to scattering can be reduced. The optical modulator 200 has the bent portions 102A where the branched optical waveguides 102 are turned at approximately 180 degrees. As a result, the length of the optical modulator 200 in a horizontal direction shown in FIG. 9 can be reduced. The optical modulator 200, therefore, can be miniaturized.

Moreover, the first diffusion area 107 is formed also on the side face 105*b* of the groove 105 arranged at a side of the optical waveguide 102, thereby suppressing increase in light loss.

The optical waveguide 102 in an optical device according to the third embodiment is turned at approximately 180 degrees at one point to have an approximate U-shape structure. As shown in FIG. 9, when a single turning point is provided on the optical waveguide 102, a light input and a light output of the optical waveguide 102 are located at the same side of the optical device. The optical waveguide 102 may have a substantially S-shaped structure with two turning points, or a structure including three or more turning points. By increasing such turning points, the optical waveguide 102 is provided with a longer working length (L0). Thus, a variable region of a phase difference can be expanded. When the optical waveguide 102 is provided with even number of turning points, the light input and the light output are located at different sides of the optical device.

While the optical modulator 200 of Mach-Zehnder interferometer type has been described in the third embodiment, the optical waveguide 102 is also applicable to a phase modulator. In comparison with the above optical modulator 200, the phase modulator has a structure different from the optical modulator 200 in one point that the phase modulator has a single optical waveguide 102 without branch points. Suppression in light loss and miniaturization of the optical waveguide 102 can also be achieved by providing the optical waveguide 102 with the first diffusion area 107 at the bent portion 102A.

The optical waveguide according to the first and the second embodiments is applicable to other optical devices, such as an optical switch, in addition to a phase modulator and an optical modulator. The optical waveguide reduces light loss on such optical device to a lower level, and enables the miniaturization of the device.

In the optical waveguide according to the first and the second embodiments, the first diffusion area formed with the first impurity is arranged partially only at the bent portion on the substrate, therefore, no stress is produced in the first diffusion area even if the optical waveguide is subjected to a temperature change. For this reason, an optical device as described in the third embodiment, which includes the optical waveguide according to the first and the second embodiments, is capable of stable operation without being influenced by a temperature change.

According to the embodiments described above, it is possible to reduce light loss in an optical waveguide, and to miniaturize the optical waveguide and an optical device using the same.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical waveguide having a bent portion that is formed with a second diffusion area formed by diffusing a second impurity on a substrate, the second diffusion area having a high refractive index, the optical waveguide comprising:
   a groove formed at a portion of the substrate corresponding to an outside of a bend of the bent portion along the second diffusion area; and
   a first diffusion area formed by diffusing a first impurity from a bottom of the groove and a side face of the groove to reduce a refractive index of the substrate.

2. The optical waveguide according to claim 1, wherein a radius curvature of the second diffusion area is approximately 2.5 millimeters or smaller.

3. The optical waveguide according to claim 1, wherein a material of the substrate includes a lithium niobate (LiNbO3).

4. The optical waveguide according to claim 1, wherein the second impurity includes titanium.

5. The optical waveguide according to claim 1, wherein the second diffusion area is formed by proton exchange.

6. The optical waveguide according to claim 1, wherein the first impurity includes magnesium oxide (MgO).

7. The optical waveguide according to claim 1, wherein the first diffusion area is formed such that a gap between the first diffusion area and the second diffusion area is largest at a bending start position and a bending end position at which the bend of the bent portion starts and ends respectively, and that the gap gradually becomes smaller toward a center of the bend of the bent portion.

8. The optical waveguide according to claim 1, further comprising a buffer layer that is formed at least on a side face of the groove and that is formed with an insulating film having a refractive index lower than that of the substrate.

9. The optical waveguide according to claim 8, wherein a material of the buffer layer includes silicon oxide (SiO2).

10. The optical waveguide according to claim 1, wherein a pattern width of the first diffusion area is approximately 5 micrometers to 20 micrometers.

11. The optical waveguide according to claim 1, wherein a pattern width of the second diffusion area is approximately 3 micrometers to 10 micrometers.

12. The optical waveguide according to claim 1, further comprising a second groove formed at a portion of the substrate corresponding to an inside of the bend of the bent portion along the second diffusion area, wherein
   the second diffusion area is arranged in a ridge portion formed in a convex ridge between the groove and the second groove.

13. The optical waveguide according to claim 12, wherein the first diffusion area is formed only on one of side faces of the ridge portion on a side corresponding to the outside of the bend of the bent portion.

14. The optical waveguide according to claim 1, wherein a depth of the groove is equal to or larger than approximately 5 micrometers from a surface of the substrate.

15. The optical waveguide according to claim 1, wherein a gap between the first diffusion area and the second diffusion area is equal to or larger than approximately 1 micrometer.

16. An optical device comprising:
   an optical waveguide that has a bent portion, and that is formed in a second diffusion area having a large refractive index formed by diffusing a second impurity on a substrate; and
   a signal electrode arranged on top of the second diffusion area along the second diffusion area, wherein
   the optical waveguide further includes
      a groove formed at a portion of the substrate corresponding to an outside of a bend of the bent portion along the second diffusion area; and
      a first diffusion area formed by diffusing a first impurity from a bottom of the groove and a side face of the groove to reduce a refractive index of the substrate.

17. A method of manufacturing an optical waveguide, comprising:
   forming a pattern having a bent portion with a second impurity film on a substrate the second impurity film to increase a refractive index;
   forming a groove at a portion of the substrate corresponding to an outside of a bend of the bent portion along the second impurity film;
   forming a pattern of a first impurity film on a bottom of the groove and a side face of the groove, the first impurity film to reduce a refractive index; and
   applying heat to both the second impurity film and the first impurity film to form a second diffusion area in which the second impurity film is diffused and the first diffusion area in which the first impurity film is diffused, inside the substrate.

18. The method according to claim 17, further comprising forming a buffer layer at least on a side face of the groove after the first diffusion area and the second diffusion area is formed, the buffer layer formed with an insulating film having a refractive index lower than that of the substrate.

* * * * *

UNITED STATES PATENT AND TRADEMARK OFFICE
CERTIFICATE OF CORRECTION

| | | |
|---|---|---|
| PATENT NO. | : 7,463,808 B2 | Page 1 of 1 |
| APPLICATION NO. | : 11/601630 | |
| DATED | : December 9, 2008 | |
| INVENTOR(S) | : Masaki Sugiyama | |

It is certified that error appears in the above-identified patent and that said Letters Patent is hereby corrected as shown below:

Column 9, Line 53, change "(LiNbO3)." to --(LiNbO$_3$).--.

Column 10, Line 6, change "(SiO2)." to --(SiO$_2$).--.

Column 10, Line 47, after "substrate" insert --,--.

Signed and Sealed this

Tenth Day of March, 2009

JOHN DOLL
*Acting Director of the United States Patent and Trademark Office*